United States Patent [19]

Marty et al.

[11] Patent Number: 4,794,097

[45] Date of Patent: Dec. 27, 1988

[54] CATALYTIC COMPOSITE PRODUCT FOR THE OXIDATION OF MERCAPTANS AND ITS USE FOR THE SWEETENING OF PETROLEUM FRACTIONS

[75] Inventors: Claude Marty; Rene Blondeau, both of Le Havre, France

[73] Assignee: Compagnie De Raffinage et de Distribution Total France, Levallois-Perrett, France

[21] Appl. No.: 72,552

[22] Filed: Jul. 13, 1987

[51] Int. Cl.⁴ .............................................. B01J 31/22
[52] U.S. Cl. .................................. 502/163; 502/150; 502/167; 502/168
[58] Field of Search ............... 502/163, 150, 167, 168

[56] References Cited

U.S. PATENT DOCUMENTS

| | | | |
|---|---|---|---|
| 2,659,691 | 11/1953 | Gislon et al. | 196/29 |
| 2,872,412 | 2/1959 | McNeill et al. | 208/203 |
| 2,908,637 | 10/1959 | Lukk et al. | 208/203 |
| 3,098,033 | 7/1963 | Weisang et al. | 208/227 |
| 4,107,078 | 8/1978 | Carlson | 502/163 |
| 4,498,978 | 2/1985 | Frame | 502/163 X |

FOREIGN PATENT DOCUMENTS

| | | | |
|---|---|---|---|
| 1542520 | 3/1970 | Fed. Rep. of Germany | 502/163 |
| 996851 | 8/1949 | France . | |
| 1230502 | 2/1959 | France . | |
| 1301844 | 7/1962 | France . | |
| 2184540 | 12/1973 | France | 502/163 |
| 1121182 | 7/1968 | United Kingdom | 502/163 |

Primary Examiner—Patrick P. Garvin
Attorney, Agent, or Firm—A. Thomas S. Safford

[57] ABSTRACT

Composite catalytic products composed of a metal chelate based catalyst on a solid adsorbent support for use in fixed-bed processes for sweetening mercaptans contained in petroleum fractions are disclosed. The composites contain from 0.05 to 5 weight percent of a metal chelate, from 5 to 15 weight percent of pyrolyzed carbon and from 60 to 90 weight percent of a mineral matrix. The support material is obtained by pyrolysis of wash concentrates of raw wools.

20 Claims, 1 Drawing Sheet

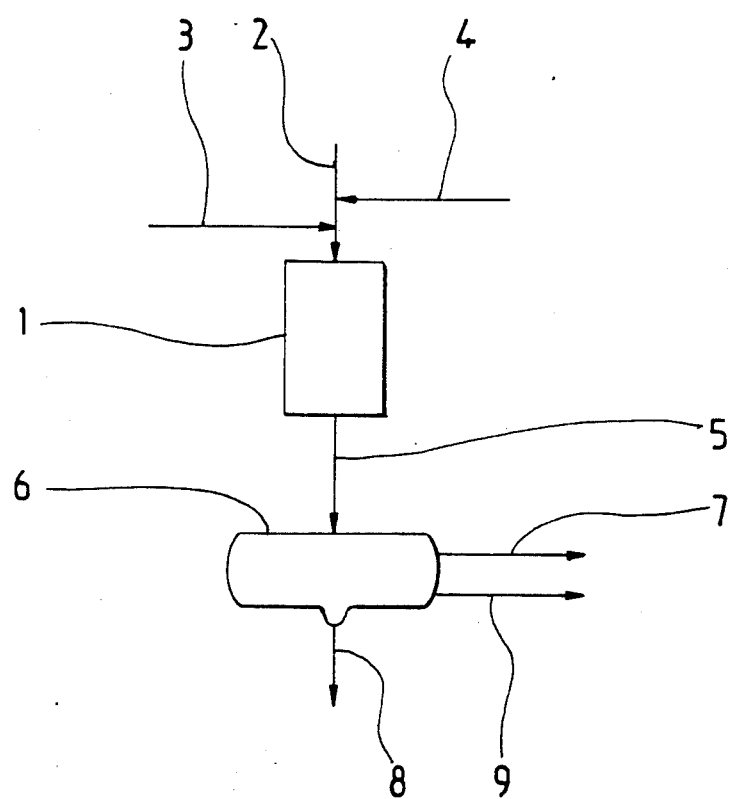

CATALYTIC COMPOSITE PRODUCT FOR THE OXIDATION OF MERCAPTANS AND ITS USE FOR THE SWEETENING OF PETROLEUM FRACTIONS

FIELD OF THE INVENTION

The present invention relates to a new composite catalyst consisting of a catalytically active component and of its support, and to the use of this composite for the sweetening of petroleum fractions in a fixed bed by conversion of the mercaptans to disulfides.

BACKGROUND OF THE INVENTION

The property possessed by certain metal chelates of catalyzing the conversion of mercaptans to disulfides when they are placed in an alkaline medium and in the presence of oxygen is known to have long had wide application. (French Pat. Nos. 996,851 and 1,230,502.)

It is also known that of these chelates, the metal phthalocyanines are frequently used in a fixed bed on certain activated carbons (French Pat. No. 1,301,844) for the sweetening of heavy gasolines and of kerosenes. In fact, certain petroleum fractions contain straight-chain or branched-chain mercaptans, or mercaptans of an aromatic nature, and/or contain tertiary and polyfunctional mercaptans of high molecular weight, which are only sparingly soluble in the alkaline solution required for the sweetening reaction. Also, petroleum fractions containing mercaptans to be oxidized are generally sweetened in the following manner: The hydrocarbon to be sweetened is mixed with the oxidizing agent (usually air), then treated in a fixed-bed reactor containing an adsorbent support of high specific surface which has previously been impregnated and over which the alkaline reactant, generally an aqueous solution of soda, is passed, either continuously at a very low rate or discontinuously, to maintain the alkalinity required for the oxidation reaction.

Among the supports generally regarded as potentially usable in the preparation of a composite catalyst capable of forming a fixed bed, a large number of solid materials is mentioned in the literature, including activated carbons obtained by the pyrolysis of wood, peat, lignite, bone or various other carbonaceous materials; natural clays and silicates, such as diatomaceous earth, fuller's earth, kieselguhr, attapulgite, feldspar, montmorillonite, halloysite and kaolin; and natural or synthetic refractory oxide minerals such as alumina, silica, the oxides of zirconium, thorium and boron, or mixtures thereof.

To be suitable for industrial use, however, a good support for sweetening catalysis must possess a number of intrinsic properties, which limit the choice of potential supports. In particular, the adsorbent support should

- be insoluble in soda and inert to the petroleum fraction to be sweetened;
- have enough active sites to bind the metal chelate effectively to its surface;
- have a sufficiently high pore volume to permit the bulkiest mercaptans to be contacted with the metal chelate with which it is impregnated; and
- have sufficiently high crushing strength to be able to withstand variations in the operating conditions imposed by the stresses of industrial operation.

Also, in practice only certain types of activated carbons have gained acceptance as catalyst supports, particularly since they may accelerate the oxidation of mercaptans under certain conditions even in the absence of any active component. (U.S. Pat. Nos. 2,872,412 and 2,908,637.) In particular, the activated carbons used up to now have a specific gravity which generally ranges from 0.2 to 0.5, a specific surface between 300 and 2500 $m^2/g$, a micropore volume between 0.3 and 0.6 $cm^3/g$, and an ash content ranging from 1 to 20 percent.

However, the industrial use of composite sweetening catalysts whose support is an activated carbon has shown that the choice of such a support entails a number of drawbacks so far as industrial operation is concerned. In fact, it has been found that sweetening reactors must be taken off-stream frequently to wash the composite (in principle with hot water) and to remove so far as possible the organic sodium salts and the gums formed on its surface by peroxidation of the hydrocarbons present in the feedstocks to be sweetened. Since the regeneration of the composite catalyst so effected is far from complete, the catalytic potential of the metal chelates deposited on activated carbons is not fully utilized. The service life of the composite in industrial operation with certain petroleum feedstock then is sharply reduced, which in view of the high cost of the activated carbon used as support can detract from the economy of the process.

BRIEF DESCRIPTION OF THE INVENTION

In the course of its many investigations aimed at finding a solution to this problem, the applicants have discovered that the drawbacks mentioned above have been due in large measure to the fact that gum formation was probably accelerated by the many specific sites with textural properties developed by the activated carbons. The applicants therefore began to conduct a systematic search for new supports adapted for use in composite catalysts that could be produced at lower cost and would require less frequent washing of the composite.

The applicants thus found that supports consisting mainly of inert mineral materials, such as refractory silicates or oxide minerals, and of pyrolyzed carbons intimately bound to these materials, though having specific surfaces and pore volumes very different from those of the supports used up to now, might well permit the development of excellent composite catalysts for the oxidation of mercaptans to disulfides without entailing the drawbacks mentioned above.

In fact, when mixtures composed mainly of
- carbon precursors such as wool waste or waste of any other hydrocarbonaceous compound of the same nature,
- refractory silicates or metallic oxides which are chemically inert and after treatment are capable of forming the framework of a solid support having good crushing strength, and
- soluble mineral salts, such as the salts of potassium or sodium in particular, are pyrolized under carefully controlled conditions, that is, at a temperature as low as possible, and preferably between 300° to 600° C., a pyrolizate in the form of solid granules is obtained from which the soluble mineral salts can be extracted simply by washing, thus creating in the interior of the support pores of sufficient size to permit the active components of the oxidation reaction to lodge in them and then to be contacted with the mercaptans to be sweetened.

The applicants have found, in particular, that the waste resulting from the washing and scouring of sheep's wool in the raw state satisfies the conditions set forth above and, after washing with water and impregnation with a metal chelate, lends itself to the preparation of an excellent composite catalyst for the sweetening of mercaptans under particularly attractive economic conditions.

BRIEF DESCRIPTION OF THE DRAWINGS

FIG. 1 shows a fixed-bed process for sweetening petroleum fraction feedstocks by oxidation of the mercaptans in the feedstock utilizing the composite catalysts of the invention.

DETAILED DESCRIPTION OF THE INVENTION

The present invention thus has as its object a new catalytic composite product intended for use in a fixed-bed process for the sweetening of the mercaptans contained in petroleum fractions and comprising a catalyst for oxidation of the mercaptans on the basis of a metal chelate with which a solid adsorbent support is impregnated, said composite product being characterized in that it contains from 0.05 to 10 weight percent of a metal chelate per gram of composite,
from 5 to 35 weight percent of pyrolized carbon, and
a mineral matrix representing from 60 to 90 weight percent of the composite.

This composite product which embodies the present invention is further characterized in that it preferably has a specific surface between 10 and 100 m$^2$/gram,
a micropore volume between 0.05 and 0.20 cm$^3$/gram,
a crushing strength between 2 and 10 kg/cm$^2$,
a specific gravity between 0.5 and 0.9, and
an ash content of over 60 percent.

A first advantage which the composite catalysts forming an embodiment of the present invention have over the commercial catalysts used up to now is that its support can be prepared at low cost from a raw material that is abundant and cheap, its cost being from 10 to 20 times lower than that of the usual activated carbons.

The composite catalysts which are embodiments of the present invention further permit a saving to be realized in the industrial use of the fixed-bed sweetening process in that they practically do not bind to their surface the organic sodium salts and the gums usually obtained in the course of the sweetening treatment by peroxidation of the hydrocarbons contained in the feedstock being treated. The industrial unit therefore does not have to be taken off stream at regular intervals to wash the catalytic bed, and such downtime can be limited solely to the operations of reimpregnation of the composite or replacement thereof at the end of the cycle.

A third advantage of the composite catalyst which is an embodiment of the present invention stems from the fact that its high content of refractory and inert materials imparts to it a crushing strength that is considerably higher than that of activated carbons, which makes it possible to dispense during industrial operation with carrying out at decompacting of the catalyst bed by spreading it and also to achieve more homogeneous loading in the preparation of the bed.

The metal chelates which are suitable for use as the active component of the composite catalyst include compounds of the porphyrin or metalloporphyrin type, of the corrin type or of the metal phthalocyanine type, and particularly their cobalt, copper, iron or vanadium salts, as well as a number of compounds from the family of sulfur dyes.

The examples which follow will serve to illustrate the invention without limit it in its broader aspects.

EXAMPLE 1

This example relates to the preparation of a composite in accordance with the invention. The starting support is obtained by carefully controlled pyrolysis of the concentrate of the sludges from the washing of raw wools intended for the textile industry. These wash concentrates contain, in fact, a mixture of wool fibers, sand, and various soluble mineral salts, in relatively constant proportions, whose pyrolysis permits a support to be obtained which after screening is present in the form of a granular material containing mainly a mixture of three constituents, namely, from 5 to 25 percent of a hydrocarbonaceous residue,
from 40 to 60 percent of a refractory mineral matrix insoluble in water, and
from 20 to 40 percent of various soluble mineral salts.

The granular material is placed directly in a reactor whose height-to-diameter ratio is about 4. The support then undergoes vigorous washing for the purpose of extracting from the matrix the soluble mineral salts which it contains and thus creating the pores necessary for its impregnation with the active component. During this wash, water is passed through the support at a temperature between 30° and 100° C. (and preferably between 50° and 90° C.) at an hourly space velocity between 0.5 and 3 (and preferably between 1 and 2) in an amount equal to from 2 to 6 times the volume of the support.

The support is then impregnated with the active material by passing an aqueous solution containing from 0.1 to 3 grams per liter of a metal chelate which, in the examples which follow, is a cobalt phthalocyanine of the commercial type (generally at a concentration on the order of 1 gram per liter) at ambient temperature over the support so washed and preferably recirculating the effluent solution.

The operation is terminated after a few hours when from 0.05 to 3 weight percent of the chelate has been deposited on the support. The composite so prepared can be used as is for the sweetening of petroleum fractions or can be dried and then stored for use in a subsequent operation.

EXAMPLE 2

This example relates to the treatment of an industrial feedstock consisting of a 50/50 mixture (by volume) of light gasoline and heavy gasoline coming from a catalytic cracker.

The feedstock, whose boiling point is between 50° and 210° C. and whose gravity at 15° C. is 0.8, contains 40 percent of aromatic compounds, 15 percent of olefins, and 45 percent of saturated hydrocarbons, and it further contains about 5000 ppm of phenols, from 300 to 800 ppm of mercaptan sulfur, and from 1000 to 5000 ppm of total sulfur.

The reaction is carried out according to the scheme of FIG. 1. The feedstock to be sweetened is placed in a tank which supplies the reactor 1 through line 2, with a make-up of an oxidizing agent, which preferably is air (line 3), and a make-up of basic solution, preferably an aqueous soda solution (line 4). The feedstock being sweetened leaves the reactor through line 5 and enters a separator 6, from which the air, the soda and the sweetened gasoline are discharged through lines 7, 8 and 9, respectively.

The operating conditions are as follows:
Volume of composite: 100 cm$^3$.
Relative pressure: 2 to 30 bar, and preferably 10 bar.
Temperature: 40° to 60° C., and preferably 40° C.
Volume of air per gram of mercaptan: 1 to 10 standard liters/gram, and preferably 2 standard liters/gram.
Feed rate of soda solution diluted to 2 percent: 0.1 to 5 percent, and preferably less than 1 percent, of the charge stock by volume.
Hourly space velocity of feedstock: 0.5 to 4, and preferably 1.

The sweetened gasoline has the following characteristics, compared to the feedstock:

|  | Feed stock | Effluent |
| --- | --- | --- |
| Total sulfur (ppm) | 4000 | 4000 |
| Mercaptans (ppm) | 700 | <1 |
| Cobalt (ppm) | <0.5 | <0.5 |
| Actual washed gums (mg/100 ml) | <10 | <5 |

EXAMPLE 3

This example is intended to demonstrate, in terms of a jet fuel fraction, the advantages which the composite of the invention has over a catalyst supported by a conventional type of activated carbon.

The starting fraction, whose gravity at 15° C. is 0.8, contains 150 ppm of mercaptan. It comes from an atmospheric distillate fraction of a Qatar crude with a boiling point between 145° and 235° C.

The operating conditions are as follows:
Volume of composite: 100 cm$^3$.
Relative pressure: 10 bar.
Temperature: 40° C.
Air feed rate: 25 ml/hr.
Feed rate of soda diluted to 8 weight percent: 0.3 ml/hr.
Hourly space velocity: 1.

The characteristics of the jet fuel fraction are presented in the table which follows, where the column headed Effluent A gives the characteristics of the fraction treated with a composite prepared as in Example 1 while the column headed Effluent B gives the characteristics of the fraction treated with a cobalt phthalocyanine deposited on activated carbon manufactured and sold by CECA S.A. (France).

|  | Feed stock | Effluent A | Effluent B |
| --- | --- | --- | --- |
| Total sulfur (ppm) | 3000 | ≦3000 | ≦3000 |
| Mercaptans (ppm) | 150 | 10–15 | 15–20 |
| Phenols (ppm) | 150 | <150 | <150 |
| Saybolt color |  | >20 | >20 |
| Cobalt (ppm) | <5 | <5 | <5 |
| Actual washed gums (mg/100 ml) |  | <7 | <7 |

These comparative results clearly show that the composite catalyst which is the object of the present invention (A), which is very inexpensive, is decidedly superior to a conventional catalyst based on activated carbon (B) since the reactor effluents contain significantly less mercaptans.

What is claimed is:

1. A composite catalytic product for use in a fixed-bed process for the sweetening of mercaptans contained in petroleum fractions comprising:
   a catalyst based on a metal chelate for oxidation of the mercaptans, and
   a solid adsorbent support impregnated with the catalyst,
   such that the composite catalytic product contains:
   from 0.05 to 10 weight percent of a metal chelate per gram of composite;
   from 5 to 35 weight percent of pyrolyzed carbon, and
   from 60 to 90 weight percent of a mineral matrix.

2. The composite catalytic product of claim 1 further having a specific surface area of from 10 to 100 m$^2$/gram.

3. The composite catalytic product of claim 2 further having a micropore volume of from 0.05 to 0.20 cm$^3$/gram.

4. The composite catalytic product of claim 3 further having a crushing strength of from 2 to 10 kg/cm$^2$.

5. The composite catalytic product of claim 4 further having a specific gravity of from 0.5 to 0.9.

6. The composite catalytic product of claim 5 further having an ash content greater than 60 weight percent.

7. The composite catalytic product of claim 1 wherein the support is the material obtained by pyrolysis of wash concentrates of raw wools utilized in the textile industry.

8. A composite catalytic product for use in a fixed bed process for the sweetening of mercaptans contained in petroleum fractions comprising:
   a catalyst based on a metal chelate for oxidation of the mercaptans, and
   a solid adsorbent support impregnated with the catalyst obtained by the pyrolysis of wash concentrates of raw wools, and
   wherein the composite is obtained by washing the pyrolyzate with water at a temperature of from 20° to 90° C., followed by impregnation with a metal chelate in aqueous solution.

9. The composite catalytic product of claim 1 wherein the metal chelate is one selected from porphyrins, metalloporphyrins, corrins, metal phthalocyanines, the cobalt, copper, iron and vanadium salts of all of the above, and sulfur dyes.

10. The composite catalytic product of claim 1 wherein the metal chelate which forms the base of the catalyst is a cobalt phthalocyanine.

11. A composite catalytic product for use in a fixed-bed process for the sweetening of mercaptans contained in petroleum fractions comprising:
   a catalyst based on a metal chelate for oxidation of the mercaptans, and
   a solid adsorbent support impregnated with the catalyst, such that the composite catalytic product contains:
from 0.05 to 10 weight percent of a metal chelate per gram of composite;
from 5 to 35 weight percent of pyrolyzed carbon and from 60 to 90 weight percent of a mineral matrix, such that the composite has:
a specific surface area of from 10 to 100 m$^2$/gram;
a micropore volume of from 0.05 to 0.20 cm$^3$/gram;
a crushing strength of from 2 to 10 kg/cm$^2$;
a specific gravity of from 0.5 to 0.9; and
an ash content greater than 60 weight percent.

12. A process for the preparation of composite catalysts for use in a fixed-bed process for sweetening mercaptans contained in petroleum fractions, comprising the steps of:
water-washing a pyrolysis residue of a mixture of a carbon precursor, one selected from refractory silicates and metallic oxides, and one selected from soluble potassium mineral salts and soluble sodium mineral salts, at a temperature of from 30° to 100° C.; and
impregnating the washed residue with an aqueous solution of a metal chelate containing from 0.5 to 3 grams/liter of metal chelate for a period of time until from 0.05 to 7 weight percent of the metal chelate is deposited on the washed residue.

13. The process of claim 12 wherein the pyrolysis residue prior to washing contains:
from 5 to 25 weight percent of a hydrocabonaceous residue;
from 40 to 60 weight percent of a refractory mineral matrix; and
from 20 to 40 weight percent of soluble mineral salts.

14. The process of claim 12 wherein the metal chelate is a cobalt phthalocyanine.

15. The process of claim 13 wherein the metal chelate is a cobalt phthalocyanine.

16. The composite catalytic product of claim 1 wherein the support is obtained by pyrolysis at between about 300° and 600° C. of wash concentrates of raw wools of the type found in the textile industry.

17. The composite catalyst product of claim 8, wherein the wash concentrates were pyrolyzed at between 300° and 600° C.

18. The composite catalytic product of claim 16, further having a specific surface area of from 10 to 100 m$^2$/gram, a micropore volume of from 0.05 to 0.20 cm$^3$/gram, a crushing strength of from 2 to 10 kg/cm$^2$, a specific gravity of from 0.5 to 0.9, and an ash content greater than 60 weight percent.

19. The process of claim 12, wherein said residue is obtained by pyrolysis at between about 300° and 600° C. of wash concentrates of raw wools of the type found in the textile industry.

20. The process of claim 15, wherein said residue is obtained by pyrolysis at between about 300° and 600° C. of wash concentrates of raw wools of the type found in the textile industry.

* * * * *